Patented Aug. 19, 1941

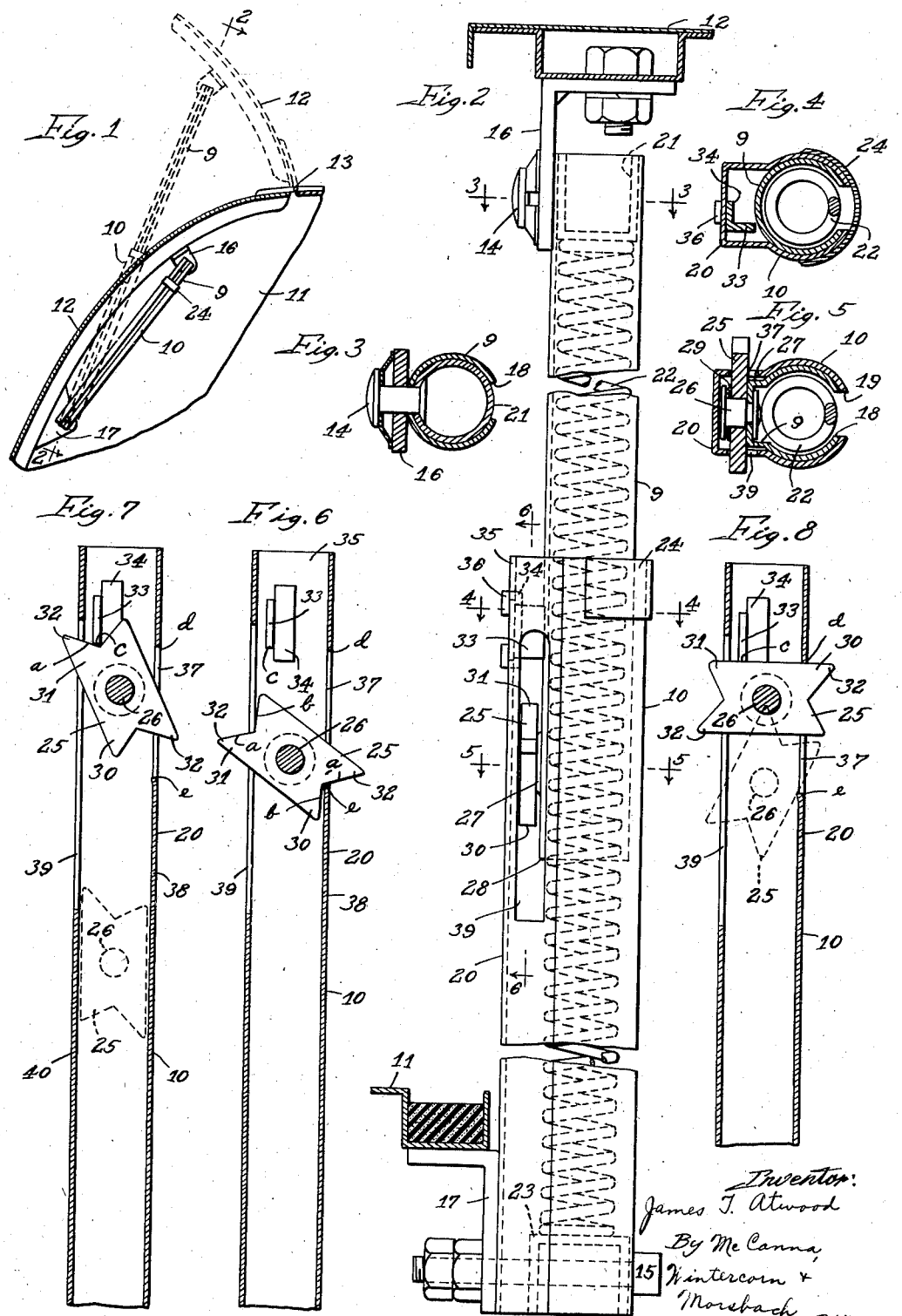

2,253,161

UNITED STATES PATENT OFFICE 2,253,161

COUNTERBALANCED LID SUPPORT

James T. Atwood, Rockford, Ill.

Application December 31, 1938, Serial No. 248,705

14 Claims. (Cl. 217—60)

This invention relates to supports for liftable hinged closures, and has particular reference to a new and improved counterbalanced support for the lid of a luggage compartment on an automobile or other vehicle.

I am aware that various kinds of foldable and telescoping type lid supports have been proposed. The telescoping type has certain distinct advantages over the folding type, the principal one being that it does not require the "elbow room" of the folding type, and there is no danger of getting fingers pinched or having the support poke a hole in luggage placed too close to the support. Some efforts have been made to provide counterbalancing means for relieving the operator of the greater portion of the weight of the lid in raising the same, but, so far as I am aware, such counterbalancing means have usually been provided in conjunction with the hinges, and, as a result, heavy spring tensions were necessary because of the small leverage available at the hinges. Such counterbalancing means usually provided too heavy spring tension at lower positions of the lid and not enough to hold the lid in raised position. It is therefore the principal object of my invention to provide a telescoping type lid support embodying a counterbalancing coiled compression spring housed inside the tubular telescoping members of the lid support, said support being operable with lighter spring pressure because of the leverage exerted that far from the lid's hinges and providing enough spring pressure to hold the lid in raised position and yet not sufficient pressure to interfere with the easy closing of the lid.

The invention is illustrated in the accompanying drawing, in which—

Fig. 1 is a side view of the rear portion of an automobile, showing a counterbalanced lid support made in accordance with my invention;

Fig. 2 is a rear view of the support in extended lid-supporting position, showing related portions of the lid and body in section on the line 2—2 of Fig. 1 and with intermediate portions of the support broken away to enable showing it on so large a scale;

Figs. 3, 4, and 5 are cross-sections on the correspondingly numbered lines of Fig. 2;

Fig. 6 is a longitudinal section on the line 6—6 of Fig. 2, and

Figs. 7 and 8 are similar sections showing the parts in other positions so as to illustrate the action of the pawl and ratchet escapement mechanism.

The same reference numerals are applied to corresponding parts throughout the views.

The present lid support constitutes an improvement on that disclosed in the copending application of Walter R. Lustig, Serial No. 215,545, filed June 24, 1938, and the pawl and ratchet escapement mechanism herein disclosed for releasably supporting the two telescoping arms 9 and 10 in extended lid-supporting relation is similar to that disclosed in the Lustig application.

11 designates the luggage compartment of an automobile, and 12 its lid or door hinged at 13 to permit raising and lowering the lid. The arms 9 and 10 are pivotally attached at 14 and 15 to the edge portion of the lid 12 and the side wall of the luggage compartment 11 on brackets 16 and 17, as shown, the brackets being suitably secured to the lid and body. The arms 9 and 10 are formed from sheet metal bent to approximately tubular form, the arm 9 being C-shaped in cross-section leaving a longitudinally extending slot 18 in one side thereof, and the arm 10 being likewise C-shaped in cross-section, leaving the longitudinal slot 19 in the same side, the arm 10 being sufficiently larger in diameter to accommodate the arm 9 in telescoping relation and it being furthermore provided with a longitudinal channel-shaped extension 20 on the diametrically opposite side from the slot 19. A thimble 21 pressed into the upper end of the arm 9 and welded or otherwise suitably secured in place provides not only reenforcement for the upper end of the arm 9 so that the stud forming the pivot 14 for pivotally connecting the arm 9 to the bracket 16 will have good support by extension through registering openings in the thimble 21 and the wall of the arm 9, as indicated in Fig. 3, but said thimble also provides an abutment for one end of the counterbalancing spring 22. The latter is a long coiled compression spring fitting closely inside the arm 9 and extending from the open lower end of the arm inside the arm 10 and finding abutment at its other end on another thimble 23 that is set in the lower end of the arm 10. The thimble 23, as clearly appears in Fig. 2, has the bolt forming the pivot 15 extending therethrough, so that the thimble provides good support for the bolt besides constituting an abutment for the counterbalancing spring 22. An arcuate sheet metal strap 24 spans the slot 19 at the upper end of the arm 10 and is welded or otherwise suitably secured in place on the arm to prevent the spaced side walls of the arm from spreading apart. It is obvious that the two telescoping arms 9 and 10 provide a good housing for the counterbalancing spring 22 to keep it from buckling sidewise intermediate its ends. This makes it practical to provide a compression spring of such length and having the necessary length of travel. I have found in actual practice that the spring 22 when made to provide enough pressure to support the lid at or near the fully raised position does not exert enough spring pressure to interfere with the easy closing of the lid. The reason such light spring pressure is practical is that the counterbalancing spring works inside the lid support located far enough from the lid's hinges 13 to have the necessary leverage, but still permit compression of the spring under the greater leverage obtainable at the outer edge of the lid. A distinct advantage in the provision of this counterbalancing spring is that from the safety standpoint there is no danger of the lid dropping accidentally in the event the lid is jostled, or is moved under wind pressure or otherwise, while the pawl and ratchet escapement mechanism releasably supports the arms 9 and 10 in lid-supporting relationship.

A two-toothed pawl 25 is rotatably mounted on a stud 26 on the outside of an embossed portion 27 provided on the wall of the arm 9 near the lower end thereof, which is indicated at 28 in Fig. 2. A spring washer 29 (Fig. 5) under the head of the stud 26 places sufficient frictional drag upon the rotation of the pawl 25 to insure having it stay in one position until forcibly turned to another. The pawl 25 is of generally rectangular form with the opposite ends thereof notched out to provide V-shaped teeth 30 and 31 which are not quite symmetrical, one prong 32 of each being slightly longer than the other prong. The surfaces $a$ and $b$ on these V-shaped teeth are adapted to have slidable engagement with ratchet abutments provided therefor on the arm 10 in the channel-shaped extension 20 thereof in the reciprocation of the pawl 25 with the arm 9 relative to the arm 10 in the manner illustrated in Figs. 6 to 8, whereby to limit extension of the arms and accordingly limit the raising of the lid 12, and thereafter limit return movement so as to support the lid in raised position, and finally thereafter again limit extension of the arms as the lid is subsequently raised again preliminary to lowering the lid to closed position. One of the ratchet abutments referred to is provided at $c$ on a lug 33 on a small sheet metal clip 34 fastened to the web 35 of the channel-shaped extension 20 by lugs 36 entered through slots in the web 35 and bent over on the outside of the channel portion 20, as clearly appears in Fig. 2. The other ratchet abutments are provided by an elongated longitudinal slot 37 provided in one of the side walls 38 of the channel portion 20, the opposite ends of this slot providing opposed abutments or shoulders $d$ and $e$ for slidable engagement with the surfaces $a$ on the teeth 30 and 31 of the pawl 25. Another elongated longitudinal slot 39 in the opposite side wall 40 of the channel portion 20 serves merely to provide operating clearance for whichever prong 32 on the pawl happens to be caused to project from the channel portion 20 when the arms of the lid support are extended to lid-supporting position.

In operation, leaving out of consideration the action of the spring 22, which was described above, at the start of a cycle when the lid 12 is being raised, the pawl 25 has its longitudinal axis in vertical alignment with the channel portion 20, as indicated in dotted lines in Fig. 7. The pawl encounters the lug 33, as shown in full lines in Fig. 7, when the lid is raised nearly as far as it will go, and as the lid is raised to the limit of its movement, the pawl 25 is turned through about 30° in a counterclockwise direction, as viewed in Fig. 7, to the position there shown, by sliding engagement of the surface $a$ on the prong 32 with the bottom surface $c$ on the lug 33. In this turning of the pawl, it has projected the prong 32 of the other tooth 30 through the slot 37, and the moment therefore that the lid is released and moves downwardly, as shown in Figs. 2 and 6, the surface $a$ on the prong 32 has sliding engagement with the shoulder $e$ at the lower end of the slot 37 and causes the pawl 25 to turn through approximately 40° in a counterclockwise direction from the position of Fig. 7 to that of Fig. 6, the pawl stopping when the surface $b$ on the other prong of the tooth 30 comes into abutment with the inner side of the side wall 38 of the channel 20. This positively limits downward movement of the arm 9 and the lid is therefore supported in raised position, substantially as illustrated in dotted lines in Fig. 1. In actual practice, the spring 22 under these conditions will not exert sufficient pressure to interfere with the solid seating of the pawl 25 on the lower end of the slot 37, but if, through accidental movement of the lid upwardly, the pawl 25 were to move to a released position, as shown in Fig. 8, it is obvious that the lid could not drop and cause damage or injury, because the spring would immediately assume support of the lid. The spring washer 29 holds the pawl in the position shown in Fig. 6 until it is forcibly turned to the position shown in Fig. 8, as by engagement with the lug 33 when the lid is raised as far as it will go, preparatory to closing it. Hence, there is no "hair trigger" action with this lid support as with the old style over-center type where slight movement of the lid was apt to cause the support to fold and allow the lid to drop. When the lid is to be closed, the operator simply raises it as far as it will go, and in this operation, the pawl 25 first encounters the lug 33 and is turned in a clockwise direction to about 20° to the position shown in Fig. 8, the movement being limited by the engagement of the other end of the pawl with the shoulder $d$ at the upper end of the slot 37. This positively limits the upward movement of the lid, and the lid can then be lowered to closed position. As indicated in dotted lines in Fig. 8, the pawl 25 in the first part of the downward movement of the arm 9 strikes the other end $e$ of the slot 37 and is turned in a counterclockwise direction through approximately 90° toward the position shown in dotted lines in Fig. 7, which is the starting position for the cycle of operation.

The pawl and ratchet escapement mechanism is substantially completely enclosed in the telescoping arms 9 and 10, so that nothing can come in contact with the parts thereof and be damaged thereby or cause damage to the lid support and possibly interfere with its operation. The only time any part of the escapement mechanism is exposed is when the teeth 30 and 31 project through the slots 37 and 39, as shown in Figs. 6, 7 and 8, but that is only when the device is in lid-supporting position, or when the pawl is moving into or out of such position and there is, of course, no danger whatever of the pawl coming in contact with anything in the luggage compartment at those times.

It is believed that the foregoing description conveys a good understanding of the objects and advantages of my invention. The appended claims have been drawn with a view to covering all legitimate modifications and adaptations.

I claim:

1. A device of the character described comprising an arm pivotally attached to a raisable lid or other hinged member, another arm in telescoping relation with the first arm and pivotally attached to a receptacle or other support on which the lid is hinged, said arms being tubular, a coiled compression spring housed inside said arms which is least compressed in the extended relationship of said arms and under those conditions measures substantially the same in length as the distance between the pivots at the remote ends of said arms, means providing abutments in said arms adjacent their pivots for the opposite ends of said spring, whereby said spring is compressed throughout closing of the lid and serves to prevent dropping of the lid from raised open position, and latch means for releasably locking said arms in extended relation positively supporting the lid in open position.

2. A device of the character described comprising a tubular arm pivotally attached to a lid or other hinged member, another tubular arm in telescoping relation with the first arm and pivotally attached to a receptacle or other support on which the lid is hinged, a coiled compression spring housed inside said arms, said arms having abutments therein for engagement with the opposite ends of said spring so as to compress the same when the lid is closed, one of said arms being inner and the other outer in respect to their telescoping relationship, the outer arm having a hollow narrow longitudinal extension, an elongated generally rectangular pawl of a width slightly less than that of the longitudinal extension and rotatably mounted on the outside of the inner arm for movement lengthwise of and inside said extension, one end of said extension only being constructed to allow the pawl to turn therein, and pawl actuating means in that end of said extension to be engaged by said pawl in successive longitudinal movements of said arms with respect to one another, to first limit extension of the arm, then limit return movement, supporting the arms in coextensive relation for support of the lid in raised position, and finally limit the extension of said arms before return of the arms to interfitting relation with the lid closed, said pawl being progressively rotated by engagement with said last mentioned means in the successive back and forth movements of the arms relative to one another.

3. A device of the character described comprising two arms in telescoping relation, one of said arms being tubular, one of said arms being pivotally attached to a lid or other hinged member and the other being pivotally attached to a receptacle or other support on which the lid is hinged, the tubular arm having a hollow narrow longitudinal extension, an elongated generally rectangular pawl of a width slightly less than that of the longitudinal extension and rotatably mounted on the outside of the other arm for movement lengthwise of and inside said extension, one end of said extension only being constructed to allow the pawl to turn therein, and pawl actuating means in that end of said extension to be engaged by said pawl in successive longitudinal movements of said arms with respect to one another, to first limit extension of the arm, then limit return movement, supporting the arms in coextensive relation for support of the lid in raised position, and finally limit the extension of said arms before return of the arms to interfitting relation with the lid closed, said pawl being progressively rotated by engagement with said last mentioned means in the successive back and forth movements of the arms relative to one another.

4. A device of the character described comprising two arms in telescoping relation, one of said arms being tubular, one of said arms being pivotally attached to a lid or other hinged member and the other being pivotally attached to a receptacle or other support on which the lid is hinged, the tubular arm having a hollow longitudinal extension substantially channel-shaped in cross-section so as to provide longitudinal side walls, and a longitudinal connecting wall, an elongated pawl rotatably mounted on a transverse axis on the other of said arms having two teeth on the opposite ends thereof, said pawl being arranged to move lengthwise of and inside said channel-shaped extension in the reciprocation of said arms relative to one another, said channel-shaped extension having a longitudinal slot provided in one side wall thereof, one end of which is adapted to be engaged by one end of said pawl to support said arms in coextensive telescoping relation with the lid in raised position, the opposite side wall of said channel-shaped extension having a registering longitudinal slot through which said pawl is adapted to project in the rotation thereof inside said channel-shapel extension, and means providing an abutment for said pawl on the connecting wall of said channel-shaped extension in laterally spaced relation to one end of the first mentioned slot and on the opposite side of the axis of rotation of said pawl relative to said slot.

5. A device of the character described comprising two arms in telescoping relation with one another, one being pivotally attached at one end to a lid or other hinged member and the other being pivotally attached at its remote end to a receptacle or other support on which the lid is hinged, one of said arms having a hollow longitudinal channel-shaped extension providing spaced longitudinal side walls and a longitudinal connecting wall, an elongated pawl rotatably mounted on a transverse axis on the other arm having two teeth on the opposite ends thereof, said pawl being arranged to move lengthwise of and inside said channel-shaped extension in the reciprocation of said arms relative to one another, said channel-shaped extension having a longitudinal slot provided in one side wall thereof, one end of which is adapted to be engaged by one end of said pawl to support said arms in coextensive telescoping relation with the lid in raised position, the opposite side wall of said channel-shaped extension having a registering longitudinal slot through which said pawl is adapted to project in the rotation thereof inside said channel-shaped extension, and means providing an abutment for said pawl on the connecting wall of said channel-shaped extension in laterally spaced relation to one end of the first mentioned slot and on the opposite side of the axis of rotation of said pawl relative to said slot.

6. A device as set forth in claim 5, including a coiled compression spring disposed in substantially parallel relation with said channel-shaped extension and having an abutment for one end thereof fixed with respect to one of said arms and another abutment for the other end of said spring fixed with respect to the other of said arms whereby the spring is arranged to be compressed in the closing of the lid.

7. A device of the character described comprising two tubular arms in telescoping relation, one being pivotally attached at one end to a lid or other hinged member and the other being pivotally attached at its remote end to a receptacle or other support on which the lid is hinged, a coiled compression spring housed in said arms having abutment at its opposite ends adjacent the pivots for said arms whereby said spring is arranged to be compressed in the closing of the lid, the outer one of said arms having a hollow longitudinal extension substantially channel-shaped in cross-section so as to provide longitudinal side walls, and a longitudinal connecting wall, an elongated pawl rotatably mounted on a transverse axis on the other of said arms having two teeth on the opposite ends thereof, said pawl being arranged to move lengthwise of and inside said channel-shaped extension in the reciprocation of said arms relative to one another, said channel-shaped extension having a longitudinal slot provided in one side wall thereof, one end of which is adapted to be engaged by one end of said pawl to support said arms in coextensive telescoping relation with the lid in raised position, the opposite side wall of said channel-shaped extension having a registering longitudinal slot through which said pawl is adapted to project in the rotation thereof inside said channel-shaped extension, and means providing an abutment for said pawl on the connecting wall of said channel-shaped extension in laterally spaced relation to one end of the first mentioned slot and on the opposite side of the axis of rotation of said pawl relative to said slot.

8. A device as set forth in claim 5 wherein the teeth of the pawl are V-shaped with the apex of the V's projecting toward one another on diametrically opposite sides of the axis of rotation of the pawl.

9. A device as set forth in claim 5 wherein the teeth of the pawl are V-shaped with the apex of the V's projecting toward one another on diametrically opposite sides of the axis of rotation of the pawl, one prong of one tooth of the pawl being longer than the other prong and the corresponding prong on the other tooth being correspondingly longer than its companion prong.

10. A device as set forth in claim 5 wherein the channel-shaped extension is of a width from side wall to side wall thereof only slightly wider than the width of the pawl whereby to serve as a guide for said pawl in the reciprocation of said arms relative to one another when the pawl is in remote relationship to the slotted portion of said channel-shaped extension.

11. A device as set forth in claim 4 including a coiled compression spring housed in said tubular arm in substantially parallel relation with said channel-shaped extension and arranged to be compressed by the other of said arms in the closing of the lid.

12. A device of the character described comprising two arms in telescoping relation with one another, one being pivotally attached at one end to a lid or other hinged member and the other being pivotally attached at its remote end to a receptacle or other support on which the lid is hinged, one of said arms having a hollow longitudinal channel-shaped extension providing spaced longitudinal side walls and a longitudinal connecting wall, an elongated pawl rotatably mounted on a transverse axis on the other arm having two teeth on the opposite ends thereof, said pawl being arranged to move lengthwise of and inside said channel-shaped extension in the reciprocation of said arms relative to one another, said channel-shaped extension having a longitudinal slot provided in one side wall thereof, one end of which is adapted to be engaged by one end of said pawl to support said arms in coextensive telescoping relation with the lid in raised position, either end of said pawl being adapted to project through the slot in the rotation thereof inside said channel-shaped extension, and means providing an abutment for said pawl on the connecting wall of said channel-shaped extension in laterally spaced relation to one end of said slot and on the opposite side of the axis of rotation of said pawl relative to said slot.

13. A device as set forth in claim 12, including a coiled compression spring disposed in substantially parallel relation with said channel-shaped extension and having an abutment for one end thereof fixed with respect to one of said arms and another abutment for the other end of said spring fixed with respect to the other of said arms whereby the spring is arranged to be compressed in the closing of the lid.

14. A device of the character described, comprising an arm pivotally attached to a raisable lid or other hinged member, another arm in telescoping relation with the first arm and pivotally attached to a receptacle or other support on which the lid is hinged, said arms being tubular, a coiled compression spring housed inside said arms engaging at its opposite ends abutments provided in the pivoted ends of said arms, said spring being of a length approximately equal to the combined lengths of said arms so as to have its opposite ends engaging said abutments when the arms are in substantially fully extended relationship, whereby said spring aids in the raising of the lid and prevents dropping of the lid from raised open position, the pivots for said arms being so located with respect to one another and with respect to the lid hinge axis that when the lid is closed the two pivots and hinge axis are disposed nearly on a straight line.

JAMES T. ATWOOD.